UNITED STATES PATENT OFFICE.

RICHARD EICHHOFF, OF ESSEN-RÜTTENSCHEID, GERMANY, ASSIGNOR, BY MESNE ASSIGNMENTS, TO ELEKTROSTAHL GES. M. BESCHR. HAFT., OF REMSCHEID-HASTEN, GERMANY.

PROCESS FOR THE DEOXIDATION OF INGOT-IRON, INGOT-STEEL, &c.

No. 801,656. Specification of Letters Patent. Patented Oct. 10, 1905.

Application filed June 15, 1904. Serial No. 212,739.

*To all whom it may concern:*

Be it known that I, RICHARD EICHHOFF, a subject of the King of Prussia, residing at No. 210/10 Essenerstrasse, Essen-Rüttenscheid, in the Kingdom of Prussia, in the German Empire, have invented certain new and useful Improvements in Processes for the Deoxidation of Ingot-Iron, Ingot-Steel, and the Like, of which the following is a specification.

It is known that in the production of all kinds of ingot-iron or ingot-steel (which I will call "steel" generally in the following statement) a smaller or larger quantity of oxygen or protoxid of iron is dissolved therein, according to the conditions of working. This fact considerably interferes with the utility of the product, and it was endeavored heretofore to counteract the detrimental influence thereof as much as possible by the addition of ferromanganese, ferrosilicon, aluminium, and other substances having a similar action.

I have discovered by means of experiments and observation that the entrance of the oxygen into the liquid steel probably is not a question of a solution or alloying of oxygen or iron protoxid with the steel, but that at a temperature somewhat above the melting-point of steel another chemical compound between the iron and the oxygen is formed which is very permanent at high temperatures and is only decomposed with great difficulty, this being proved by the fact that frequently large quantities of carbon are found in the presence of considerable quantities of iron protoxid. I have furthermore found that this chemical compound even if formed at a high temperature will be decomposed as soon as the temperature of the molten steel is reduced and that it is formed again at every increase of temperature so long as oxidation products of the iron are present in the slag. Furthermore, I have found that the hotter the steel is and the smaller the quantities of foreign bodies which it contains the quicker this compound is formed and the greater the quantities of it produced. It also was found that as soon as it is possible to entirely deoxidize the steel, so as to prevent the formation of carbonic-oxid gas during solidification, there is no separation of hydrogen, nitrogen, or other gases.

According to the present invention the above-described phenomena discovered by me are utilized for the deoxidation of ingot-iron and ingot-steel in the following manner:

First. If steel produced by the Bessemer, Thomas, and similar air-firing processes shall be deoxidized, it is taken from the converter and while keeping back the slag is poured into a second furnace or other receptacle, in particular also an electric furnace, in which it can cool down to somewhat above its solidifying temperature and in which it is covered with lime and sand or other materials that will readily form a neutral slag free from oxids of iron the iron protoxid or similar bodies contained in the steel will then separate from it and pass into the slag. From this it is reduced by the use of broken charcoal or coke or of calcium carbid or other bodies having similar action, whereby also any further formation of protoxid of iron is prevented. Under the said neutral slag the steel is then again raised to the necessary temperature for casting, and the further necessary additions—such as carbon, manganese, silicon, chromium, &c., according to the purpose to which it is to be applied—are added to it. The steel can then be run into ingots or molds without any formation of blow-holes therein.

Second. If steel which is made in a Siemens-Martin furnace or in any other furnace is to be deoxidized, the original slag may be made neutral—that is, free from oxid of iron—by adding charcoal, coke, calcium carbid, or the like, or the original slag may be drawn off and may be replaced by a new neutral slag, or in the end the steel can, while keeping back the original slag, be poured into a second furnace or other receptacle, in particular also an electric furnace, and there be covered with a neutral slag. In all these cases it is then allowed to cool down to somewhat above its solidifying temperature, by which the protoxid of the iron or similar bodies will pass into the slag, from which it is reduced by addition of charcoal, coke, calcium carbid, &c., and then the steel will be reheated and finished as described above.

Having thus fully described my invention, what I claim is—

1. The process for the deoxidation of ingot iron, steel and the like, which consists in forming a neutral slag over the molten metal, cooling down the metal until the oxidation products contained therein have separated therefrom, and then again heating up the molten metal while under the neutral slag.

2. The process for the deoxidation of ingot iron, steel and the like, which consists in producing and maintaining over the molten metal a neutral slag, cooling down the metal under said slag until the oxidation products contained therein have separated therefrom, and then again heating up the molten metal while under the neutral slag.

3. The process for the deoxidation of ingot iron, steel and the like, which consists in forming a neutral slag over the molten metal, cooling down the metal under said slag, until the oxidation products therein have mixed with the slag, neutralizing said oxidation products to maintain the slag neutral, and then again heating up the molten metal.

4. The process for the deoxidation of ingot iron, steel, or the like, which consists in cooling the molten metal to a point somewhat above the solidifying temperature of said metal and neutralizing the oxidation products thereby separated from the said molten metal, and then again heating up the molten metal in the absence of oxidizers.

5. The process for the deoxidation of iron, steel or the like, which consists in cooling the molten metal until the oxidation products contained therein have separated therefrom, neutralizing the said separated oxidation products, and then again heating up the molten metal in the absence of oxidizers.

6. The process for the deoxidation of ingot iron, steel or the like, which consists in cooling the molten metal until the oxidation products contained therein have separated therefrom, neutralizing said oxidation products, then again heating up the molten metal in the absence of oxidizers, and casting said metal.

7. The process for the deoxidation of ingot iron, steel or the like, which consists in cooling the molten metal until the oxidation products contained therein have separated therefrom, neutralizing said oxidation products, then again heating up the molten metal, adding the desired ingredient to alloy the metal and then casting.

8. The process of manufacturing ingot iron, steel or the like, which consists in first smelting and purifying the iron, then separating the molten metal from its slag, forming a neutral slag upon said metal, allowing the molten metal to cool down to somewhat above the solidifying temperature, reducing the oxidation products which have passed into the slag, by means of suitable reducing agents, and then heating the molten metal to a casting temperature.

9. The process of manufacturing ingot iron, steel and the like, which consists in smelting and purifying the metal in a Bessemer, Thomas or other furnace, conveying the molten metal, free from slag, into another receptacle, forming on said molten metal a neutral slag, allowing said metal to cool down to somewhat above the solidifying temperature, then reducing the oxidation products, which have passed into the slag, by means of reducing agents, then heating up the metal to a casting temperature, while under the neutral slag, alloying the metal and casting.

In witness whereof I have hereunto set my hand in presence of two witnesses.

RICHARD EICHHOFF.

Witnesses:
   ERNEST ANDRÉ,
   PETER LIEBER.